US008213498B2

(12) United States Patent
Liu et al.

(10) Patent No.: US 8,213,498 B2
(45) Date of Patent: Jul. 3, 2012

(54) BITRATE REDUCTION TECHNIQUES FOR IMAGE TRANSCODING

(75) Inventors: Shizhong Liu, San Diego, CA (US); Ricky Nguyen, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1262 days.

(21) Appl. No.: 11/868,211

(22) Filed: Oct. 5, 2007

(65) Prior Publication Data

US 2008/0298469 A1   Dec. 4, 2008

Related U.S. Application Data

(60) Provisional application No. 60/941,041, filed on May 31, 2007.

(51) Int. Cl.
*H04N 11/02* (2006.01)
(52) U.S. Cl. ............... 375/240; 375/240.01; 375/240.26
(58) Field of Classification Search .............. 375/240.26
See application file for complete search history.

(56) References Cited

U.S. PATENT DOCUMENTS

| | | | | |
|---|---|---|---|---|
| 5,426,463 | A * | 6/1995 | Reininger et al. | 375/240.03 |
| 6,473,531 | B1 | 10/2002 | Kunitake | |
| 6,829,560 | B2 | 12/2004 | Lehman | |
| 6,871,228 | B2 | 3/2005 | Shah et al. | |
| 2002/0039451 | A1 | 4/2002 | Bruna et al. | |
| 2002/0044605 | A1* | 4/2002 | Nakamura | 375/240.04 |
| 2002/0112047 | A1 | 8/2002 | Kushwaha et al. | |
| 2002/0131645 | A1* | 9/2002 | Hamilton | 382/251 |
| 2002/0141502 | A1* | 10/2002 | Lin et al. | 375/240.27 |
| 2002/0159457 | A1* | 10/2002 | Zhang et al. | 370/391 |
| 2002/0163964 | A1* | 11/2002 | Nichols | 375/240.03 |
| 2002/0163967 | A1* | 11/2002 | Youn et al. | 375/240.12 |
| 2003/0023910 | A1* | 1/2003 | Myler et al. | 714/704 |
| 2003/0161542 | A1* | 8/2003 | Ridge | 382/246 |
| 2004/0066973 | A1* | 4/2004 | Prakash et al. | 382/239 |
| 2005/0183143 | A1 | 8/2005 | Anderholm et al. | |

FOREIGN PATENT DOCUMENTS

EP 0481768 4/1992

(Continued)

OTHER PUBLICATIONS

European Search Report 08006534.5, search authority Munich, Dec. 3, 2008.

(Continued)

*Primary Examiner* — Jason Mattis
*Assistant Examiner* — Stephen J Clawson
(74) *Attorney, Agent, or Firm* — Matthew J. Evans; James R. Gambale, Jr.

(57) ABSTRACT

This disclosure describes techniques for encoding data to compress image data to a reduced size. The techniques may be particularly effective in transcoding an image to a reduced size for transmission. An encoding device may transcode an image to an acceptable file size using bitrate control techniques that affect the entire image uniformly to transcode the image. For example, the encoding device may modify one or more quantization tables as a function of the near linear relationship between bitrate (R) and the number of zero-valued quantized transform coefficients to reduce the file size uniformly over the entire image. Alternatively, or additionally, the encoding device may transcode the image using bitrate control techniques that affect only specific localized regions of the image.

13 Claims, 6 Drawing Sheets

FOREIGN PATENT DOCUMENTS

| | | |
|---|---|---|
| EP | 0481768 A2 | 4/1992 |
| EP | 0618733 A2 | 10/1994 |
| EP | 1173025 A1 | 1/2002 |
| EP | 1659753 A1 | 5/2006 |
| JP | 4002291 A | 1/1992 |
| JP | 4156794 A | 5/1992 |
| JP | 4178088 A | 6/1992 |
| JP | 5227520 A | 9/1993 |
| JP | 6284407 A | 10/1994 |
| JP | 6291676 A | 10/1994 |
| JP | 6292192 A | 10/1994 |
| JP | 7066978 A | 3/1995 |
| JP | 7066982 A | 3/1995 |
| JP | 9247466 A | 9/1997 |
| JP | 10174103 A | 6/1998 |
| JP | 2000101846 A | 4/2000 |
| JP | 2000197049 A | 7/2000 |
| JP | 2001186517 A | 7/2001 |
| JP | 2003116006 A | 4/2003 |
| JP | 2004112712 A | 4/2004 |
| JP | 2005051659 A | 2/2005 |
| JP | 2007074100 A | 3/2007 |
| WO | WO8200376 A1 | 2/1982 |
| WO | 2006102571 A1 | 1/2006 |

OTHER PUBLICATIONS

International Search Report PCT/US08-065011, International Search Authority European Patent Office Feb. 20, 2009.

Written Opinion PCT/US08/065011, Search Authority European Patent Office Feb. 20, 2009.

Zhihai He et al., "A Linear Source Model and a Unified Rate Control Algorithm for DCT Video Coding," IEEE Transactions on Circuits and Systems for Video Technology, vol.12, No. 11, Nov. 2002, p. 970-982.

Zhihai He et al., "Optimum Bit Allocation and Accurate Rate Control for Video Coding via p-Domain Source Modeling," IEEE Transactions on Circuits and Systems for Video Technology, vol. 12, No. 10, Oct. 2002, p. 840-849.

ISO/IEC 10918-1, ITU-T Rec. T.81. Information Technology—Digital compression and coding of continuous-tone still images: Requirements and guidelines, 1993.

ISO/IEC 10918-3, ITU-T Rec. T.84. Information Technology—Digital compression and coding of continuous-tone still images: Extensions, 1997.

Yong Kwan Kim et al., "A Novel Linear Source Model and a Unified Rate Control Algorithm for H.263/MPEG-2/MPEG-4," IEEE International Conference on Acoustics, Speech, and Signal Processing, vol. 3, May 2001, pp. 1777-1780.

Ramchandran Kannan et al., "Rate-Distortion Optimal Fast-Thresholding with Complete JPEG/MPEG Decoder Compatibility," IEEE Transactions on Image Processing, vol. 3, No. 5, Sep. 1994, pp. 700-704.

B.G. Sherlock et al., "A Model for JPEG Quantization," 1994 International Symposium on Speech, Image Processing and Neural Networks, Apr. 13-16, 1994, Hong Kong, pp. 176-179.

Siu-Wai Wu et al., "Rate-Constrained Picture-Adaptive Quantization for JPEG Baseline Coders," IEEE International Conference on Acoustics, Speech, and Signal Processing, vol. 5, Apr. 1993, pp. 389-392.

* cited by examiner

BITRATE REDUCTION TECHNIQUES FOR IMAGE TRANSCODING

This application claims the benefit of U.S. Provisional Application No. 60/941,041, filed May 31, 2007, the entire content of which is hereby incorporated by reference.

TECHNICAL FIELD

This disclosure relates to compression, and particularly compression of images.

BACKGROUND

Compression of images into image files for transmission and storage has become essential in many different applications, including Internet transmission of images, digital imaging, picture messaging and the like. Image compression techniques, such as the Joint Photographic Experts Group (JPEG), may allow high-resolution images to be stored in a relatively small image file. With the convergence of digital cameras and wireless communication devices, these image files can now be shared over wireless networks. This sharing may be costly, however, in terms of network resources such as time and bandwidth. In an effort to reduce or limit these costs, wireless network providers sometimes impose a limit on the file size of image files that may be transmitted over the network. To meet these file size restrictions, image compression to the imposed file size limit may result in a significant loss in the quality of the image.

SUMMARY

This disclosure describes techniques for encoding data to compress image data to a reduced size. The techniques may be particularly effective in transcoding an image to a reduced size for transmission. The transcoding techniques described herein may be utilized in numerous applications. One such application in which the techniques may be utilized is in transmission over a wireless network. For example, a user may use a mobile telephone with image capture capability, e.g., a so-called camera phone or video phone, to take a digital picture. Typically the digital picture captured is a high resolution image, such as a high resolution JPEG image. To send the captured image to another phone, however, the image file of the high resolution image may need to be transcoded to a smaller file size, e.g., lower resolution, to meet transmission requirements of a wireless network service provider or to better fit screen size and color limitations of the receiving device.

In one aspect, a method comprises of processing digital image data comprises scaling one or more quantization tables as a function of a computed scaling factor, encoding a plurality of blocks of pixels of the digital image data using the one or more scaled quantization tables, tracking a difference between a number of bits encoded at an $n^{th}$ block of the plurality of blocks of pixels of the digital image data and a number of bits that ideally should be encoded at the $n^{th}$ block to achieve a target bitrate, and removing one or more bits used to encode a portion of the plurality of blocks of the image data when the difference is greater than or equal to a threshold.

In another aspect, an apparatus for processing digital image data comprises a memory that stores one or more quantization tables for use in encoding a plurality of blocks of pixels of the digital image data and an encoding module that scales the one or more quantization tables as a function of a computed scaling factor, encodes a plurality of blocks of pixels of the digital image data using the one or more scaled quantization tables, tracks a difference between a number of bits encoded at an $n^{th}$ block of the plurality of blocks of pixels of the digital image data and a number of bits that ideally should be encoded at the $n^{th}$ block to achieve a target bitrate, and removes one or more bits used to encode a portion of the plurality of blocks of the image data when the difference is greater than or equal to a threshold.

In another aspect, an apparatus of processing digital image data comprises means for scaling one or more quantization tables as a function of a computed scaling factor, means for encoding a plurality of blocks of pixels of the digital image data using the one or more scaled quantization tables, means for tracking a difference between a number of bits encoded at an $n^{th}$ block of the plurality of blocks of pixels of the digital image data and a number of bits that ideally should be encoded at the $n^{th}$ block to achieve a target bitrate, and means for removing one or more bits used to encode a portion of the plurality of blocks of the image data when the difference is greater than or equal to a threshold.

In another aspect, a computer-program product for processing digital image data comprising a computer readable medium having instructions thereon. The instructions comprise code for scaling one or more quantization tables as a function of a computed scaling factor, code for encoding a plurality of blocks of pixels of the digital image data using the one or more scaled quantization tables, code for tracking a difference between a number of bits encoded at an $n^{th}$ block of the plurality of blocks of pixels of the digital image data and a number of bits that ideally should be encoded at the $n^{th}$ block to achieve a target bitrate, and code for removing one or more bits used to encode a portion of the plurality of blocks of the image data when the difference is greater than or equal to a threshold.

In another aspect, a wireless communication device handset for processing digital image data comprises an encoding module that scales one or more quantization tables as a function of a computed scaling factor, encodes a plurality of blocks of pixels of the digital image data using the one or more scaled quantization tables, tracks a difference between a number of bits encoded at an $n^{th}$ block of the plurality of blocks of pixels of the digital image data and a number of bits that ideally should be encoded at the $n^{th}$ block to achieve a target bitrate, and removes one or more bits used to encode a portion of the plurality of blocks of the image data when the difference is greater than or equal to a threshold and a transmitter that transmits the encoded blocks of pixels.

In another aspect, an integrated circuit device for processing digital image data comprising at least one processor that is configured to scale one or more quantization tables as a function of a computed scaling factor, encode a plurality of blocks of pixels of the digital image data using the one or more scaled quantization tables, track a difference between a number of bits encoded at an $n^{th}$ block of the plurality of blocks of pixels of the digital image data and a number of bits that ideally should be encoded at the $n^{th}$ block to achieve a target bitrate, and remove one or more bits used to encode a portion of the plurality of blocks of the image data when the difference is greater than or equal to a threshold.

In another aspect, a method of processing digital image data comprises identifying a desired number of zero-valued quantized transform coefficients to achieve a target bitrate, determining a scaling factor for use in scaling one or more quantization tables based on the desired number of zero-valued quantized transform coefficients, scaling a luma quantization table and a chroma quantization table as a function of the determined scaling factor, wherein the chroma quantization table is scaled more than the luma quantization table and encoding a plurality of blocks of pixels of the digital image data using the scaled luma and chroma quantization tables.

In another aspect, a method of processing digital image data comprises obtaining a plurality of quantized transform coefficients for at least one block of pixels of the digital image data, selecting at least one of the plurality of quantized transform coefficients that has a value that is a power of two, subtracting a value of one from the values of the one or more selected quantized transform coefficients, and encoding the plurality of quantized transform coefficients.

In another aspect, a method of processing digital image data comprises encoding at least one block of pixels of the digital image data to obtain a bit sequence, identifying a plurality of bits of the bits sequence that are arranged in such a manner to act as a marker that requires adding of one zero byte, changing one of the bits of the bit sequence such that the bit sequence no longer acts like a marker sequence, and transmitting the bit sequence.

The techniques described in this disclosure may be implemented in hardware, software, firmware, or any combination thereof If implemented in software, the software may be executed in a processor, which may refer to one or more processors, such as a microprocessor, application specific integrated circuit (ASIC), field programmable gate array (FPGA), or digital signal processor (DSP), or other equivalent integrated or discrete logic circuitry. The software that executes the techniques may be initially stored in a computer-readable medium and loaded and executed by a processor. Accordingly, this disclosure also contemplates computer-readable media comprising instructions to cause a processor to perform any of a variety of techniques as described in this disclosure. In some cases, the computer-readable medium may form part of a computer program product, which may be sold to manufacturers and/or used in a device. The computer program product may include the computer-readable medium, and in some cases, may also include packaging materials.

The details of one or more examples are set forth in the accompanying drawings and the description below. Other features, objects, and advantages will be apparent from the description and drawings, and from the claims.

DETAILED DESCRIPTION

This disclosure describes techniques for encoding data to compress image data to a reduced size. The techniques may be particularly effective in transcoding an image to a reduced size for transmission. The transcoding techniques described herein may be utilized in numerous applications. One such application in which the techniques may be utilized is in transmission over a wireless network. For example, a user may use a mobile telephone with image capture capability, e.g., a so-called camera phone or video phone, to take a digital picture. Typically the digital picture captured is a high resolution image, such as a high resolution JPEG image. To send the captured image to another phone, however, the image file of the high resolution image may need to be transcoded to a smaller file size, e.g., lower resolution, to meet transmission requirements of a wireless network service provider or to better fit screen size and color limitations of the receiving device.

The captured image may be transcoded to an acceptable file size using bitrate control techniques that affect the entire image uniformly to transcode the image. Such uniform bitrate control techniques are referred to herein as macroscale bitrate control techniques. The macroscale bitrate control techniques may, for example, include modification of one or more quantization tables as a function of the near linear relationship between bitrate and the number of zero-valued quantized transform coefficients as the primary means of achieving macroscale bitrate control.

Alternatively, or additionally, the captured image may be transcoded using bitrate control techniques that affect only specific localized regions of the image. These localized bitrate control techniques are referred to herein as microscale bitrate control techniques. In this case, the transcoding techniques affect only a portion of the image, such as a subset of blocks of the image. In one aspect, the microscale techniques include selectively reducing values of the coefficients to represent the coefficient with a smaller number of bits. In another aspect, the microscale techniques include eliminating the need for padding bytes by adjusting a bit sequence that is indicative of a marker.

Figure 1:
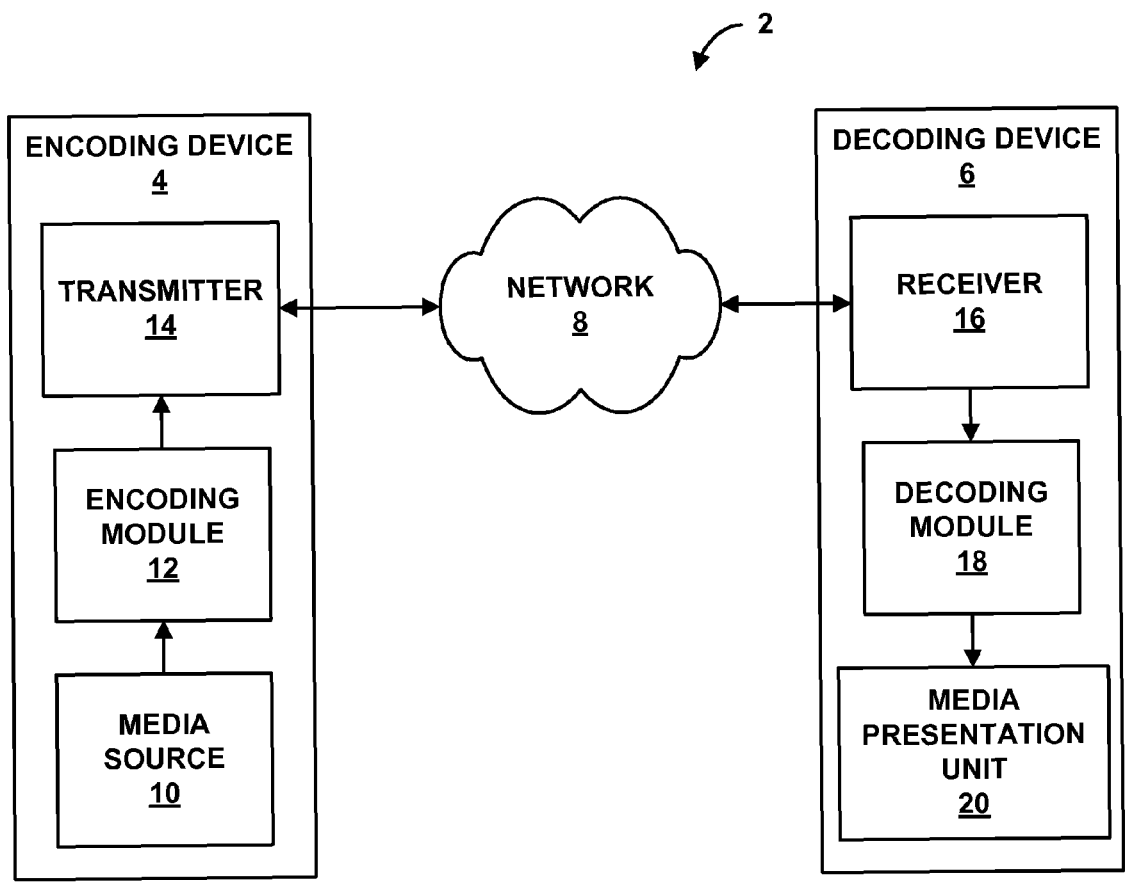
FIG. 1 is a block diagram illustrating an exemplary system that implements the encoding techniques described herein.

FIG. 1 is a block diagram illustrating an exemplary system 2 that implements the encoding techniques described herein. System 2 includes an encoding device 4 and a decoding device 6 connected by a network 8. Encoding device 4 obtains an image from a source and encodes the image in accordance with the techniques described below to reduce the size of the image for transmission over network 8 to decoding device 6 or for storage within a memory of encoding device 4. Encoding device 4 and decoding device 6 may comprise any wired or wireless devices, such as personal computers, mobile radiotelephones, servers, network appliances, computers integrated into vehicles, video gaming platforms, portable video game devices, computer workstations, computer kiosks, digital signage, mainframe computers, television set-top boxes, network telephones, personal digital assistants (PDAs), mobile media players, home media players, digital video projectors, or other types of electronic devices. As one example, encoding device 4 or decoding device 6 may be provided within a wireless communication device handset, such as a mobile telephone as described above, along with receive, transmit and other suitable components.

Encoding device 4 may include a media source 10 to generate image data. Media source 10 may, for example, be a digital video or still photo camera to capture the image data of a scene of interest. In some aspects, media source 10 may be integrated within encoding device 4. As an example, media source 10 may be integrated in a mobile telephone to form a so-called camera phone or video phone. Alternatively, media source 10 may be a stand-alone device, such as a stand-alone digital camera, coupled to encoding device 4 via a wired or wireless link. Other examples of a media source 10 include an image archive, or a stream of images or video from a content provider.

Media source 10 captures image data of a scene of interest. The captured image data may be still images or possibly full motion video sequences, in which case image processing may be performed on one or more image frames of the generated video sequence. Although the encoding techniques described in this disclosure may be generally applicable to captured digital video, application of such techniques to digital still images will be described for purposes of illustration. Media source 10 provides the captured image data to encoding module 12. In some aspects, such as when encoding device 4 is coupled to a stand-alone media source, the image provided by media source 10 to encoding module 12 may already be compressed. For example, the stand-alone media source may initially compress the image, e.g., upon capturing the image. Alternatively, media source 10 may provide encoding module 12 with raw image data.

When media source 10 provides encoding module 12 with raw image data, encoding module 12 encodes the captured image to compress the image into a particular image compression format for storage and/or transmission. Encoding module 12 may compress the image using any of a number of image compression formats, including JPEG, Tagged Image File Format (TIFF), Bitmap (BMP) or other image compression format. In the case of video, encoding module 12 may compress the video using any number of video compression formats, such as Motion Pictures Expert Group (MPEG), International Telecommunication Union (ITU) H.264 and the like. For exemplary purposes, however, the techniques will be described in the context of JPEG.

In particular, encoding module 12 may perform an integer transform, such as an 8×8 integer transform or a Discrete Cosine Transform (DCT), to the raw image data to generate a frequency domain representation in the form of a matrix of coefficients. Encoding module 12 may then quantize the coefficients of the matrix of coefficients to reduce the amount of information associated with high-frequency coefficients. Encoding module 12 encodes the quantized coefficients using a compression encoding algorithm such as entropy encoding or run-length coding algorithm. The encoded image may be stored in a memory (not shown in FIG. 1) of encoding device 4.

Encoding module 12 may be further configured to compress the image by partitioning the image into a plurality of subsets of pixels and compress each of the subsets of pixels by encoding the subsets individually. These subsets of pixels may be referred to as blocks. In the case of the JPEG standard, for example, the encoding module 12 may partition the image into 8×8 blocks and compress each of the 8×8 blocks separately. Blocks of larger or smaller than eight rows or columns are also possible.

As described above, a user of encoding device 4 may desire to transmit the compressed image file over network 8 to decoding device 6. Network 8 may comprise one or more wired or wireless communication networks, or a combination thereof. In some aspects, a service provider of network 8 may impose file size limitations on images transmitted over network 8. As an example, the service provider may impose a maximum file size transmission capability of 300 kilobytes (KB). For a typical 5 megapixel image, on the other hand, the file size may be roughly 1-2 megabytes (MB) when initially compressed by either encoding module 4 or media source 10. Thus, in order to meet the transmission requirements of the service provider of network 8, encoding device 4 may need to transcode the stored image to generate a smaller image file.

To transcode the captured image to an acceptable file size, the encoding device 4 may utilize one or more of the techniques described herein to reduce the coding bitrate, thus reducing the file size. In some aspects, encoding module 12 may utilize bitrate control techniques that affect the entire image uniformly to transcode the image. Such uniform bitrate control techniques are referred to herein as macroscale bitrate control. Encoding module 12 may, for example, modify one or more quantization tables used for coding the image as the primary means of achieving macroscale bitrate control. As will be described in detail below, encoding module 12 may modify the quantization tables as a function of the near linear relationship between bitrate (R) and the number of zero-valued quantized transform coefficients. The near linear relationship may, for example, apply to any block based transformation coding system.

Alternatively, or additionally, encoding module 12 may use bitrate control techniques that affect only specific localized regions of the image to transcode the image to an acceptable file size. These localized bitrate control techniques are referred to herein as microscale bitrate control. In this case, the transcoding techniques do not affect the entire image uniformly, but only a portion of the image. For example, the microscale bitrate control techniques may apply to only a subset of the blocks of the image. In one aspect, encoding module 12 may identify one or more quantized transform coefficients that are a power of two and reduce the value of the identified coefficient by one. This allows encoding module 12 to represent the coefficient with a smaller number of bits while only having a small affect on the quality of the image. In another aspect, encoding module 12 may identify the occurrence of a bit sequence that requires padding bytes and change at least one of the bits of the sequence such that padding bytes are no longer required.

In some aspects, encoding module 12 may utilize one or more of the microscale bitrate control techniques independently of the macroscale bitrate control techniques. For example, encoding module 12 may utilize only the microscale bitrate control techniques to reduce the bitrate to transcode the image to a smaller file size. In another example, encoding module 12 may utilize the microscale bitrate control techniques during the initial coding of the raw image data. Thus, the microscale bitrate control techniques may be used during initial compression to reduce the file size of the image.

Alternatively, encoding module 12 may use the microscale bitrate control techniques in conjunction with the macroscale bitrate control techniques to make further bitrate reductions, when necessary, to meet the target bitrate. In other words, encoding module 12 may implement two tiers of bitrate control to transcode the image: a first tier of bitrate control on a macroscale level, where techniques globally affect the entire image equally and uniformly, and a second tier of bitrate control on a microscale level, where the techniques affect specific localized regions of the image. This two-tiered strategy allows encoding module 12 to first coarsely reduce the bitrate to approach the target file size and then make fine adjustments to the bitrate as necessary. In this manner, the microscale bitrate control may only make the further adjustments when the macroscale bitrate control techniques are not sufficient. For example, microscale bitrate control may only make further bitrate reductions when the number of bits encoded during the transcoding process exceeds a threshold.

After reducing the bitrate of the image data to generate a smaller file size, transmitter 14, or other network interface, transmits the image across network 8 to decoding device 6. Decoding device 6 receives the encoded image via receiver 16 and decodes the encoded image data with decoding module 18. Decoding device 6 may possibly present the decoded image to a user of decoding device 6 via media presentation unit 20, which may include a display device and audio device, if applicable.

The techniques described in this disclosure may provide several advantages. In particular, the transcoding techniques reduce the file size of an image while maintaining sufficient quality. Moreover, the transcoding techniques may be used to reduce a file size to meet particular file size requirements imposed by network service providers. In this manner, encoding device 4 can transcode the image to the correct size in one pass of transcoding, instead of performing several re-encodings or several passes through an image to reach the optimal solution. Moreover, using the techniques to transcode the image allows encoding device 4 to initially compress the image with a higher-quality and only reduce the quality of the image when necessary for transmission. In this manner, the file size limit does not constrain the high-quality images created or stored by a user. Instead, the file size limit constrains only the images that require transmission. However, the techniques may also be useful to constrain the images for compressed storage.

Figure 2:
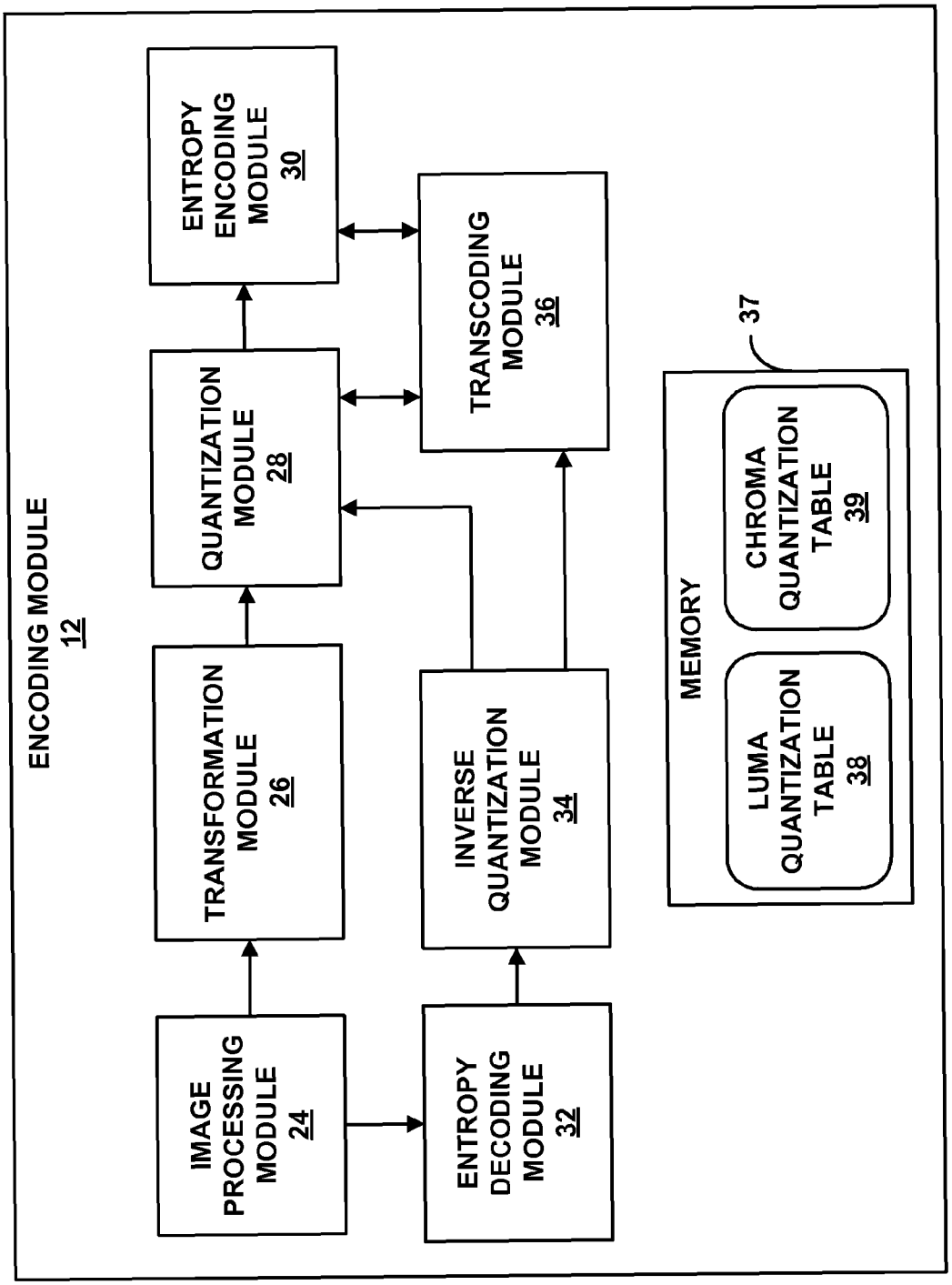
FIG. 2 is a block diagram illustrating an exemplary encoding module in further detail.

FIG. 2 is a block diagram illustrating an exemplary encoding module, such as encoding module 12 of FIG. 1, in further detail. Encoding module 12 includes an image processing module 24, a transformation module 26, a quantization module 28, an entropy encoding module 30, an entropy decoding module 32, an inverse quantization module 34, a transcoding module 36 and a memory 37. As will be described in further detail herein, the components of encoding module 12 may be used for both initially encoding raw image data as well as transcoding previously encoded image data to reduce the size of the encoded image data. In some aspects, encoding module 12 may reside within a wireless communication device handset to encode images and/or video for transmission to another wireless communication device over a wireless network.

Image processing module 24 receives image data from media source 18 (FIG. 1). The image data received from media source 18 may be raw image data directly from a plurality of image sensors or encoded an image file of initially compressed image data. In the case of raw image data, image processing module 24 may convert the raw image data to the YCbCr color space. Image data in the YCbCr color space includes a luma component Y that represents the brightness of the image and two chroma components Cb and Cr that represent color along the blue axis and red axis, respectively. The conversion to the YCbCr color space may be advantageous because encoding module 12 may retain more luma information, i.e., more of the Y component, by discarding additional chroma information, i.e., Cb and Cr information. This may be advantageous because the human visual system is more sensitive to brightness (luminance Y) than color along the blue or red axis (chrominance Cb and Cr). Similar techniques, however, may be utilized in other color spaces, such as the RGB color space.

Image processing module 24 may additionally downsample one or more of the color components. Downsampling is usually done by a factor of two in either or both of the horizontal direction (e.g., along the rows) and vertical direction (e.g., along the columns). Common downsampling ratios are expressed as H1V1 (no downsampling) for which one Y sample is encoded for each one set of Cb and Cr samples, H2V1 (chroma downsampled in horizontal direction along the rows) for which two Y samples are encoded for each one set of Cb and Cr samples, and H2V2 (chroma downsampled in both vertical direction along the columns and horizontal direction along the rows) for which four Y samples are encoded for each one set of Cb and Cr samples. In some cases, encoding module 12 may only downsample the chroma components. In other cases, encoding module 12 may downsample both the luma and chroma components, but downsample the chroma components more than the luma components because it is less perceptible to the human visual system.

Regardless of whether the image data is raw image data or previously compressed image data, image processing module 24 may partition the image data into blocks of pixels and process each of the blocks independently. In accordance with the JPEG standard, image processing module 24 may partition the image data into 8×8 blocks. However, blocks of larger or smaller than eight rows or columns are also possible. Partitioning the image data into blocks and processing each of the blocks independently may reduce the amount of memory space and time required to encode and/or transcode the image.

When the image data received from media source 18 is raw image data from an array of sensors, encoding module 12 may perform initial compression of the image. Encoding module 12 may initially compress the image using standard image compression techniques. Alternatively, encoding module 12 may utilize one or more of the techniques described herein to initially compress the image data. In either case, transformation module 24 applies an integer transformation to the blocks of image data to generate a frequency domain representation in the form of a matrix of transform coefficients. The transformation may, for example, be an 8×8 integer transform or DCT. As described above, the result of the transformation is a matrix of coefficients. In the case of the JPEG standard, for example, each of the 8×8 blocks corresponds to a matrix of 64 coefficients that include one DC component and 63 AC components.

After the transformation, quantization module 28 quantizes the transformed coefficients. Quantization module 28 may quantize the coefficients in a variety of ways depending on the coding standard being employed. Quantization module 28 may, for example, apply a quantization table to the transform coefficients to quantize the coefficients. Quantization scales the transform coefficients to allow encoding of a coefficient "level" as opposed to the actual value itself. Quantization tables that have larger values result in larger scaling of the transform coefficients as described below. Since the human eye is more sensitive to low frequency components, typical quantization tables provide more levels for low frequencies than for high frequencies. In some aspects, quantization module 28 may apply a luma quantization table 38 for the Y component and a chroma quantization table 39 for one or both of the Cb and Cr components. Chroma quantization table 39 often has larger scaling step sizes that result in quantization module 28 discarding more chroma information to allow encoding module 12 to keep more luma information. Default values for the quantization tables may be recommended by the particular compression standard utilized. Alternatively, particular devices, e.g., digital cameras and/or image software, may utilize their own custom quantization tables.

Entropy encoding module 30 encodes the quantized transform coefficients using an entropy encoding scheme. To compress the quantized coefficients using an entropy encoding scheme, entropy encoding module 30 may organize the quantized coefficients into a vector by taking a zigzag pattern of the coefficients such that the low frequency coefficients are grouped at the beginning of the scan and the high frequency components at the end of the scan. In other words, entropy encoding module 30 may arrange all of the quantized coefficients in the two dimensional matrix of quantized coefficients into a one-dimensional vector of quantized coefficients.

Entropy encoding module 30 may then apply an entropy encoding scheme, such as Huffman coding or arithmetic coding, to the vector of quantized coefficients. Using Huffman coding as an example, entropy encoding module 30 encodes each quantized coefficient as a Huffman code and a residue that is appended after the Huffman code. For the DC coefficient, the Huffman code indicates the size, in bits, of the magnitude of a difference between the current DC value and a DC value of a previous image. In other words, the Huffman code indicates the magnitude of the DC difference that can be represented by that particular number of bits. If the DC difference is −6, for example, the Huffman code indicates the size 3 because it takes 3 bits to represents the value of 6, i.e., the magnitude. However, the Huffman code indicating the size 3 also represents a plurality of other magnitudes, namely −7, −5, −4, 4, 5, 6 and 7. Thus, entropy encoding module 30 appends the residue to uniquely identify which one of the plurality of DC differences of that size corresponds with the DC difference. Entropy encoding module 30 identifies the number −6 by the 3-bit residue "010," which is binary for 2 because −6 is the second-lowest difference of size 3. So to encode a DC difference of −6, entropy encoding module 30 outputs the Huffman code for size 3, and then emits three bits "010."

For the AC coefficients, the Huffman code indicates a concatenation of a "run" and a "size." The "run" is the number of consecutive zeros in the zig-zag order of AC coefficients and the "size" is the size in bits of the subsequent nonzero coefficient. The residue, as with DC coefficients, represents a unique identifier that identifies the one of the values of the plurality of possible values corresponding to the size of the nonzero coefficient. For a zig-zag scan that contains the sequence "0003," entropy encoding module 30 produces a run of three and a size of two with residue "11." Entropy encoding module 30 emits the Huffman code for a run/size of 3/2, and then emits two residual bits "11."

In accordance with the JPEG standard, entropy encoding module 30 has two special symbols for encoding of AC runlengths. The first special symbol is the end-of-block (EOB) symbol that indicates that the remainder of the block consists of only zeroes and is designated with a run/size of 0/0. Since the size is 0, no residue is coded. The second special symbol is the zero-run-length (ZRL) value, which means there are 16 consecutive zeroes in the zig-zag scan. Since run and size are each represented by up to 4-bits, the maximum value of run is 15. It makes sense, then, that the ZRL run/size symbol is 15/0 (i.e., 15 zeroes followed by a 0). Again, since size is 0, no residue is coded.

Four standard Huffman tables are defined in the JPEG standard, one each for DC luma components, DC chroma components, AC luma components and AC chroma components. These standard tables define a Huffman code for every possible symbol, e.g., 162 distinct possible values in the case of JPEG. Entropy encoding module 30 may use the standard Huffman tables defined by the JPEG standard. Alternatively, entropy encoding module 30 may define custom Huffman tables. In some instances, these custom Huffman tables may include a reduced number of Huffman codes. For example, a custom Huffman table may include codes for only 100 out of the possible 162 values.

In some aspects, the encoding scheme may include a particular bit sequence that act as a marker. The marker may be used, for example, to identify regions of metadata. The metadata that stores information about the image, such as dimensions, downsampling ratios, quantization tables and Huffman tables. In the JPEG standard, entropy encoding module 30 may use a two-byte marker that begin with the byte 0xFF to identify regions of metadata followed by a byte indicating the type of metadata that follows. In case the entropy encoding of coefficients happens to produce a byte-aligned 0xFF, entropy coding module 30 stuffs a zero byte 0x00 into the bitstream to disambiguate the coefficient bitstream from a marker.

When the initially compressed image data is too large to meet transmission requirements of a service provider or a display of a decoding device, encoding module 12 may need to transcode the image to generate a smaller image file. In other words, encoding device 12 may re-compress the image data to meet the requirements of the service provider or the display of the decoding device. Image processing module 24 receives encoded image data from media source 18 (FIG. 1). As described above, media source 18 may be memory 38 or an external device, such as a digital camera. In some aspects, image data processing module 24 may partition the encoded image data into blocks of pixels and encoding module 12 may transcode each of the blocks separately. Transcoding each of the blocks separately may result in increased efficiency in terms of speed and memory usage.

To transcode the image data, entropy decoding module 32 decodes the encoded image data using Huffman decoding. Entropy decoding module 32 may utilize the same Huffman coding tables to decode the encoded image data that are used by entropy encoding module 30 to encode the image data. The Huffman coding tables may, for example, be stored within memory 38. Inverse quantization module 34 performs inverse quantization to generate transform coefficients for the image data. In one aspect, transcoding module 36 may transcode the image data in the frequency domain. In other words, encoding module 12 may perform the transcoding on the transform coefficients instead of performing an inverse transform to obtain the raw image data. In other aspects, however, encoding module 12 may include an inverse transform module that obtains the raw image data and transcode the image using the raw image data. Transcoding the image data in the frequency domain may reduce the amount of processing time by eliminating the need to apply an inverse transform function to the transform coefficients.

Transcoding module 36 may utilize macroscale bitrate reduction techniques, i.e., bitrate reduction techniques that affect the entire image uniformly, to reduce the size of the image data. For example, transcoding module 36 may scale luma quantization table 38, chroma quantization table 39 or both, and re-encode the image data using the scaled quantization tables. In one aspect, transcoding module 36 may scale luma quantization table 38 and/or chroma quantization table 39 as a function of a p-domain analysis that utilizes the near linear relationship between bitrate (R) and p, i.e., the percentage of zero-valued quantized transform coefficients. In particular, transcoding module 36 may find the linear relationship between p and the bitrate R. The bitrate R can be modeled in the $\rho$-domain as:

$$R = \theta(1-\rho), \quad (1)$$

where $\theta$ is a constant slope and determined by the image contents.

To simplify the arithmetic, $\rho$ may be replaced with z, which represents the number of zero-valued quantized transform coefficients in integer form rather than as a ratio. Thus, equation (1) may be re-written as $$R - R_{min} = \theta(z_{max} - z), \quad (2)$$

where $z_{max}$ is the total number of AC coefficients in the block of the image and $R_{min}$ is the minimum number of AC bits that can represent the block. Since equation (2) should only reflect the bits that are affected by the scaling of AC quantization components, EOB symbols may not be considered. Thus, $R_{min}$ represents the value of R if every block in the image contained all zeroes, or equivalently, just an EOB symbol.

Transcoding module 36 may calculate the target number of zero-valued quantized transform coefficients ($z_T$) using a target bitrate $R_T$, the bitrate of the originally encoded image $R_o$, and the number of zero-valued quantized transform coefficients of the originally encoded image $z_o$. In one aspect, transcoding module 36 calculates $z_T$ as shown in equations (3)-(5).

$$\theta_o = \frac{R_o - R_{min}}{z_{max} - z_o} \quad (3)$$

$$R_T - R_{min} = \theta_o(z_{max} - z_T) \quad (4)$$

-continued $$z_T = z_{max} - \frac{R_T - R_{min}}{\theta_o} \quad (5)$$

Transcoding module 36 may obtain $R_o$ and $z_o$ from the initially encoded image, e.g., during the initial encoding of the image. Transcoding module 36 may compute $R_T$ based on a target file size ($F_T$) specified by a user or obtained from a network service provider. The target file size $F_T$ may, for example, be specified in bytes, and include header information and DC bits as well as the AC bits. To compute the target bitrate $R_T$, the target file size $F_T$ is multiplied by a constant and the number of bits used for header information (H) and DC information (DC) are subtracted, i.e., $R_T = 8*F_T - H - DC$.

Transcoding module 36 may calculate the number of zero-valued coefficients (z) for an image using a histogram that counts values of quantized transform coefficients. The histogram of quantized transform coefficients may be defined as: H(q, i, v)=the number of occurrences of absolute quantized coefficient value |v| in zig-zag scan entry i (zero-indexed) using quantization table q (zero-indexed). Thus, transcoding module 36 may recalculate z for an image for any scaling of the quantization tables. For example, the number of zero-valued quantized transform coefficients of the originally encoded image corresponds with $z_o = \Sigma_{q=0}^1 \Sigma_{i=1}^{63} H(q, i, v=0)$. As another example, suppose that the seventeenth entry of the first quantization table is scaled by four. Then, the value z increases by exactly $\Sigma_{v=1}^3 H(q=0, i=16, v)$, because all quantized transform coefficients with magnitude less than four in the seventeenth entry of the first table will be requantized to zero. Based on the histogram, transcoding module 36 may select a scaling factor s such that the scaling of luma quantization table 38 and chroma quantization table 39 results in a z that does not exceed $z_T$. As an example, suppose that a histogram of an image indicates that there are 1000 coefficients with a value of 1 and 2000 coefficients with a value of 2. Moreover, suppose that the number of target zero-valued coefficients ($z_T$) is 1500. Transcoding module 36 selects a scaling factor of 2, which is the largest scaling factor that does not result in z exceeding $z_T$. More specifically, selecting scaling factor of 2 results in 1000 coefficients becoming zero-valued, which is less than $z_T$. A scaling factor of 3, on the other hand, would result in 3000 coefficients becoming zero-valued, i.e., all the '1' coefficients and all the '2' coefficients, which exceeds $z_T$. By selecting the scaling factor that does not overshoot $z_T$, transcoding module 36 does not reduce the size of the image farther than required.

In some cases, however, transcoding module 36 may need to further reduce the number of zero-valued coefficients. In the example described above, transcoding module 36 may need to further reduce the number of zero-valued coefficients by 500 more coefficients. To this end, transcoding module 36 may apply a second scaling factor that is larger than the first scaling factor to a portion of one or both of the quantization tables. Using the selected scaling factor s, transcoding module 36 may select a position index k, such that $$z_T \geq z_o + \sum_{q=0}^{1} \sum_{i=1}^{63} \sum_{v=1}^{s-1} H(q, i, v) + \sum_{n=k(n \neq 64)}^{127} H\left(q = \left\lfloor \frac{n}{64} \right\rfloor, i = n \bmod 64, v = s\right). \quad (6)$$

In particular, once transcoding module 36 selects the scaling factor s, all coefficients with values less than s will become zeros as a result of the quantization. In the example described above, all the coefficients with a value of '1' will become '0'. Since the resulting number of zeros is less than the target number of zeros, however, transcoding module 36 begins to force those coefficients that have values equal to s to zero, starting from the last coefficients in of the sequence. In other words, transcoding module 36 scales at least a portion of the coefficients by the scaling factor s+1. Transcoding module 36 may, for example, set k equal to 127 and slowly decrements k until the number of zeros meets the target. In this manner, the first k coefficients are scaled by a factor s and the rest of the (127−k) coefficients are scaled by a factor s+1 while. As described above, the scaling factor s and s+1 take on values that are greater than or equal to one. Moreover, the scaling factor s is less than scaling factor s+1. As will be described in detail below, the last portion of the coefficients of the sequence, i.e., the coefficients scaled by the factor s+1, correspond to chrominance coefficients.

Transcoding module 36 may order quantization entries of luma quantization table 38 and chroma quantization table 39 into a single sequence, and determine k using the sequence. In some aspects, the quantization entries of the quantization tables may be ordered such that the sequence begins with low frequency quantization entries of luma quantization table 38, followed by high frequency quantization entries of luma quantization table 38, then followed by low frequency quantization entries of chroma quantization table 39, and finally high frequency quantization entries of chroma quantization table 39. Thus, transcoding module 36 may be viewed as concatenating the AC quantization entries of both luma quantization table 38 and chroma quantization table 39 into one long sequence with the luma entries ordered in a zig-zag scan first followed by the chroma entries appended to the end of the luma entries. Transcoding module 36 may order the entries of the quantization tables using other ordering techniques. For example, transcoding module 36 may generate a sequence of entries starting with low frequency luma entries followed by one or more low frequency chroma entries, then followed by high frequency luma entries and high frequency chroma entries. The DC components of both luma quantization table 38 and chroma quantization table 39 are not included in the scan. Thus, the DC components of luma quantization table 38 and chroma quantization table 39 are not scaled.

Thus, transcoding module 36 may scale the first k entries by scaling factor s and the remainder of the entries (e.g., 128-k in the example above) by a larger scaling factor, e.g., s+1. As described above, scaling factor s and s+1 are both greater than or equal to one, thus resulting in an increased number of zero-valued transform coefficients. The two matrices on the next page are example matrices of applying the scaling factors to the respective quantization tables in accordance with this technique. The first scaling factor matrix is applied to luma quantization table 38 and the second matrix is applied to chroma quantization table 39.

TABLE 1

Luma Scaling Matrix $$\begin{bmatrix} 1 & s & s & s & s & s+1 & s+1 & s+1 \\ s & s & s & s & s+1 & s+1 & s+1 & s+1 \\ s & s & s & s+1 & s+1 & s+1 & s+1 & s+1 \\ s & s & s+1 & s+1 & s+1 & s+1 & s+1 & s+1 \\ s+1 & s+1 & s+1 & s+1 & s+1 & s+1 & s+1 & s+1 \\ s+1 & s+1 & s+1 & s+1 & s+1 & s+1 & s+1 & s+1 \\ s+1 & s+1 & s+1 & s+1 & s+1 & s+1 & s+1 & s+1 \\ s+1 & s+1 & s+1 & s+1 & s+1 & s+1 & s+1 & s+1 \end{bmatrix}$$

TABLE 2

Chroma Scaling Matrix $$\begin{bmatrix} 1 & s+1 & s+1 & s+1 & s+1 & s+1 & s+1 & s+1 \\ s+1 & s+1 & s+1 & s+1 & s+1 & s+1 & s+1 & s+1 \\ s+1 & s+1 & s+1 & s+1 & s+1 & s+1 & s+1 & s+1 \\ s+1 & s+1 & s+1 & s+1 & s+1 & s+1 & s+1 & s+1 \\ s+1 & s+1 & s+1 & s+1 & s+1 & s+1 & s+1 & s+1 \\ s+1 & s+1 & s+1 & s+1 & s+1 & s+1 & s+1 & s+1 \\ s+1 & s+1 & s+1 & s+1 & s+1 & s+1 & s+1 & s+1 \\ s+1 & s+1 & s+1 & s+1 & s+1 & s+1 & s+1 & s+1 \end{bmatrix}$$

In this manner, transcoding module 36 scales chroma quantization table 39 more than luma quantization table 38, thus better preserve the brightness of the image. Moreover, scaling portions of the entries of the quantization tables by different scaling factors reduces the likelihood of overshooting our target bitrate, i.e., reducing the bitrate by too much and thus reducing the quality of the image when unnecessary. Additionally, scaling portions of the entries of the quantization tables by different scaling factors also reduces the likelihood of undershooting our target bitrate, i.e., not reducing the bitrate by enough. Overshooting may occur if transcoding module 36 scaled every entry of both quantization tables by s+1. Undershooting may occur if transcoding module 36 scaled every entry of both quantization tables by s. This scheme of two scaling factors s and s+1 acting on partitions determined by index k provides fine control over the number of zeroes produced by the new quantization tables.

Transcoding module 36 may also use transcoding techniques that affect only specific localized regions of the image, i.e., microscale bitrate control. As described above, the microscale bitrate control techniques do not affect the entire image uniformly, but only a portion of the image (e.g., a subset of the blocks of the image). The microscale bitrate control techniques may be used in conjunction with the macroscale bitrate control techniques to further reduce the size of image, when necessary. In this manner, transcoding module 36 may implement two tiers of bitrate control to transcode the image: a first tier of bitrate control on a macroscale, where global transcoding techniques affect the entire image equally and uniformly, and a second tier of bitrate control on a microscale, where the effect of the transcoding operation is localized to specific regions of the image. This two-tiered strategy allows the transcoding module 36 to first coarsely approach the target bitrate and then make fine adjustments as necessary. Alternatively, the microscale rate control techniques may be utilized independently of the macroscale rate control techniques.

During the transcoding of the image data, transcoding module 36 tracks the number of bits that have been transcoded to determine whether the transcoding is on course to reach the target bitrate $R_T$. Transcoding module 36 determines when further bitrate reduction is necessary and activates microscale bitrate control when further bitrate reduction is needed. For an image with original bitrate $R_o$, transcoding module 30 may determine whether the ratio of the number of bits decoded for the original image $R_d(n)$ and the number of bits encoded for the transcoded image $R_e(n)$ is equal to ratio between the original bitrate and the target bitrate, i.e., $R_o:R_T$. Ideally, the ratio of bits in the decoded original image $R_d(n)$ to the bits in the encoded new image $R_e(n)$ is equal to $R_o:R_T$ at the $n^{th}$ block of coefficients, i.e., $$\frac{R_d(n)}{R_e(n)} \approx \frac{R_o}{R_T} = \frac{R_d(N)}{R_T}, \tag{7}$$

where $R_d(n)$ and $R_e(n)$ denote the number of bits already decoded and encoded, respectively, at the $n^{th}$ block, $R_o$ is the original image bitrate, which is equal to $R_d(n)$ if the image has a total of N blocks, and $R_T$ is the target bitrate of the transcoded image.

The proportions in equation (7) can be made more accurate if the constant offset of the minimum number of bits is removed, just as in the case of ρ-domain analysis in equation (2), to obtain the equation:

$$\frac{R_d(n) - R_{min}(n)}{R_e(n) - R_{min}(n)} = \frac{R_d(N) - R_{min}(N)}{R_T - R_{min}(N)}. \tag{8}$$

Since transcoding module 36 is designed to control the target bitrate at the $n^{th}$ block to reject this proportion, it is possible to substitute the target bitrate at the $n^{th}$ block $R_t(n)$ for $R_e(n)$ in equation (8) and solve for $R_t(n)$. The result is shown in equation (9). Transcoding module 36 computes a difference ($\Delta$) between $R_e(n)$ and $R_t(n)$ in accordance with equation (10). This difference represents the error ($\epsilon$), i.e., the difference between the number of bits actually encoded at the $n^{th}$ block during the transcoding of the image and the number of bits that ideally should be encoded at the $n^{th}$ block.

$$R_t(n) = \frac{R_T - R_{min}(N)}{R_d(N) - R_{min}(N)}(R_d(n) - R_{min}(n)) + R_{min}(n) \tag{9}$$

$$\Delta = \varepsilon = R_e(n) - R_t(n) \tag{10}$$

Transcoding module 36 may monitor the difference Δ during the transcoding process to determine whether to activate one or more of the microscale techniques to further reduce the number of bits. In particular, transcoding module 36 may activate the one or more microscale bitrate control techniques when Δ is greater than or equal to a threshold. The threshold may, for example, be a function of the target bitrate, e.g., 5% of the target bitrate. In this manner, transcoding module 36 uses Δ as an indicator of whether or not the microscale techniques should be invoked. Transcoding module 36 may further utilize a magnitude of Δ to determine the number of bits that need to be removed from the bitstream to bring the Δ within the appropriate limits.

Transcoding module 36 may further reduce the number of bits in the bitstream by selectively reducing the values of one or more coefficients. As described above, the encoded bitstream of the image is comprised mostly of Huffman codes and residue strings for the AC coefficients. By selectively reducing the values of one or more coefficients, transcoding module 36 may reduce the length of the Huffman code for the reduced coefficients. This is because smaller coefficient values are usually more frequent than larger coefficient values and thus are usually assigned shorter Huffman codes. Moreover, transcoding module 30 may save bits in the residue by selectively reducing one or more of the coefficient values. As described above, entropy encoding module 30 assigns codes for AC coefficients based on the run-length of zeroes and the binary size of the coefficient. Transcoding module 36 cannot change the run-length of zeroes without radically altering the block, but it can subtly change the binary size of a coefficient. To do so, transcoding module 36 may identify coefficients with values that are equal to, or at least close to, a power of two and reduce those coefficients so that they are smaller than the power of two. For example, if the coefficient value to be encoded is a power of 2, transcoding module 36 decrements the coefficient value by 1. For a coefficient value of eight, for example, transcoding module 36 codes the length of the residue with four bits. Transcoding module 36 decrements the coefficient value of eight by one, resulting in a new coefficient value of seven. The coefficient value of seven is represented by a residue of three bits, thereby reducing the bitstream by one bit. Moreover, the Huffman code to represent the run-size is likely also shorter resulting in additional bit savings. Similarly, reducing a coefficient value of nine by two results in a new coefficient value of seven, which may be represented by a reduced number of bits and a shorter Huffman code. Reducing the coefficient value by two, however, results in additional distortion. Thus, the number of bits by which the value may be reduced depends on the amount of distortion that is considered acceptable.

In some aspects, transcoding module 36 may omit selecting coefficient values that when reduced would equal zero. For example, in the case of selecting coefficients that are a power of two, transcoding module 36 may omit selecting coefficient values of one (which is a power of two). If transcoding module 36 selects coefficients having a value of one and decrements those coefficients to a value of zero, that particular component of the transform is eliminated entirely. This introduces more distortion and/or artifacts than desired. Therefore, transcoding module 36 may not reduce coefficients with a value of one.

Alternatively, or additionally, transcoding module 36 may further reduce the number of bits of the bitstream by reducing the number of padding bytes. As described above, transcoding module 36 may insert padding bytes following a bit sequence that corresponds to a marker for metadata. In the case of the JPEG standard, for example, a zero byte 0x00 may be inserted after the occurrence of 0xFF in the entropy coding bitstream to differentiate the actual coefficient bitstream from a marker. Transcoding module 36 may reduce the number of bits of the bitstream by one byte (eight bits) by eliminating the padding bytes needed to differentiate a byte-aligned sequence of eight ones from a marker. To avoid the use of padding bytes, transcoding module 36 identifies locations in the bitstream where there is a bit sequence representative of a marker. In the JPEG standard, for example, transcoding module 36 may identify locations in the bitstream in which there is a 0xFF (i.e., eight consecutive ones).

In one aspect, transcoding module 36 may include a bit buffer that stores the leftmost bits that comprise the next byte written to the bitstream. Huffman codes and residues are alternately appended on the right, with their most significant bit being the leftmost bit. The leftmost eight bits can contain any of the following sequences: (1) only bits from Huffman code (H), (2) only bits from residue (R), (3) bits of the end of the Huffman code and the start of residue (HR), (4) bits of the end of the residue and the start of Huffman code (RH), (5) bits of the end of the Huffman code and bits of the entire residue and bits of the start of the next Huffman code (HRH), (6) end of the residue and an entire Huffman code and the start of the next residue (RHR) or (7) any of items (2)-(6) with HR or RH pairs inserted in the middle of the sequence.

Transcoding module 36 may change one or more bits of the eight bits that represent the residue. When altering a residue, transcoding module 36 may change the least significant bit of the residue that prevents the writing of 0xFF to the bitstream. In this manner, transcoding module 36 determines which of the eight bits to change such that Huffman codes are preserved and the change in residue is minimal. In the list of seven possible cases above, case (1) is not modifiable because it is not desirable to change the Huffman code. However, the JPEG standard does not define a Huffman code that is all 1 bits because that is reserved as a prefix for longer codewords. Using this information, cases (1), (6) and (7) will not produce 0xFF in the case of JPEG. In all of cases (2)-(5), transcoding module 36 changes the least significant bit of the residue that still lies within the leftmost eight bits of the bit buffer. Upon changing this bit, the bit sequence no longer represents a marker and no padding bytes are necessary. In this manner, transcoding module 36 attempts to achieve the greatest reduction in bitrate with the smallest amount of distortion.

Transcoding module 32 continues to implement either one or both of the microscale bitrate control techniques for the individual blocks of pixels currently being transcoded until the difference Δ between the number of bits actually encoded at the $n^{th}$ block during the transcoding of the image and the number of bits that ideally should be encoded at the $n^{th}$ block falls below the threshold. In some cases, Δ may fall below the threshold upon reducing the bits in current block using the microscale bitrate control techniques. In other cases, however, the microscale bitrate control techniques may be utilized over a plurality of blocks of the image before Δ falls below the threshold. Upon falling below the threshold, transcoding module 32 stops implementing the microscale bitrate control techniques and only implements the macroscale bitrate control techniques, unless the error increases beyond the threshold again.

The transcoding framework of this disclosure may use the observer design pattern. In the observer design pattern, when an object changes its state, it raises an event and notifies any software observers who are listening for that particular event. The object publishes the event to its subscribers. Each subscriber then performs actions relevant to information contained in the event. Several subscribers may respond to the same event, each with completely different functionality, and related functions can be packaged into one module. Also, the observer design pattern allows the transcoding to proceed in an online fashion without keeping too much state in memory. As soon as a block is decoded, a subscribed encoder can immediately encode it.

In the example illustrated in FIG. 2 there are four basic modules in the transcoding framework: the entropy decoding module 32, the transcoding module 36, the quantization module 28, and the entropy encoding module 30. The decoding module 32 reads the original bitstream and produces data for manipulation. The decoding module 32 is the main publisher of information to subscribers. The other three modules may subscribe to decoding module 32 events. During a first pass decoding, transcoding module 36 subscribes to the decoding module 32 and collects global image statistics. Transcoding occurs on a second pass. During the second pass, transcoding module 36 subscribes to the decoding module 32 and encoding module 30 subscribes to the transcoding module 36. The transcoding module 36 also subscribes to the encoding module 30 to track encoding statistics. Thus, the decoding module 32 is run twice, and only the subscriptions are changed. Pseudocode for the main program is provided below.

create decoding module from original file
    create transcoding module
    link transcoding module to decoding module
    decode entire image (collect statistics)
    reset decoding module
    reset transcoding module
    create encoding module
    link transcoding module to decoding module and encoding module
    decode entire image (transcode and write new image)
    destroy decoding module
    destroy encoding module
    destroy transcoding module Another design pattern may be implemented in the transcoding module 36 called the strategy pattern. This pattern simply means that several algorithms (or strategies) may implement one function. The strategy pattern becomes useful when evaluating and comparing different algorithms for their effectiveness in achieving accurate bitrate control. The framework implements every algorithm in question, and the main program simply needs switches to plug in the correct algorithm.

The foregoing techniques may be implemented individually, or two or more of such techniques, or all of such techniques, may be implemented together in encoding module 12. The components in encoding module 12 are exemplary of those applicable to implement the techniques described herein. Encoding module 12, however, may include many other components, if desired, as well as fewer components that combine the functionality of one or more of the modules described above. The components in encoding module 12 may be implemented as one or more processors, digital signal processors, application specific integrated circuits (ASICs), field programmable gate arrays (FPGAs), discrete logic, software, hardware, firmware, or any combinations thereof. Depiction of different features as modules is intended to highlight different functional aspects of encoding module 12 and does not necessarily imply that such modules must be realized by separate hardware or software components. Rather, functionality associated with one or more modules may be integrated within common or separate hardware or software components.

Figure 3:
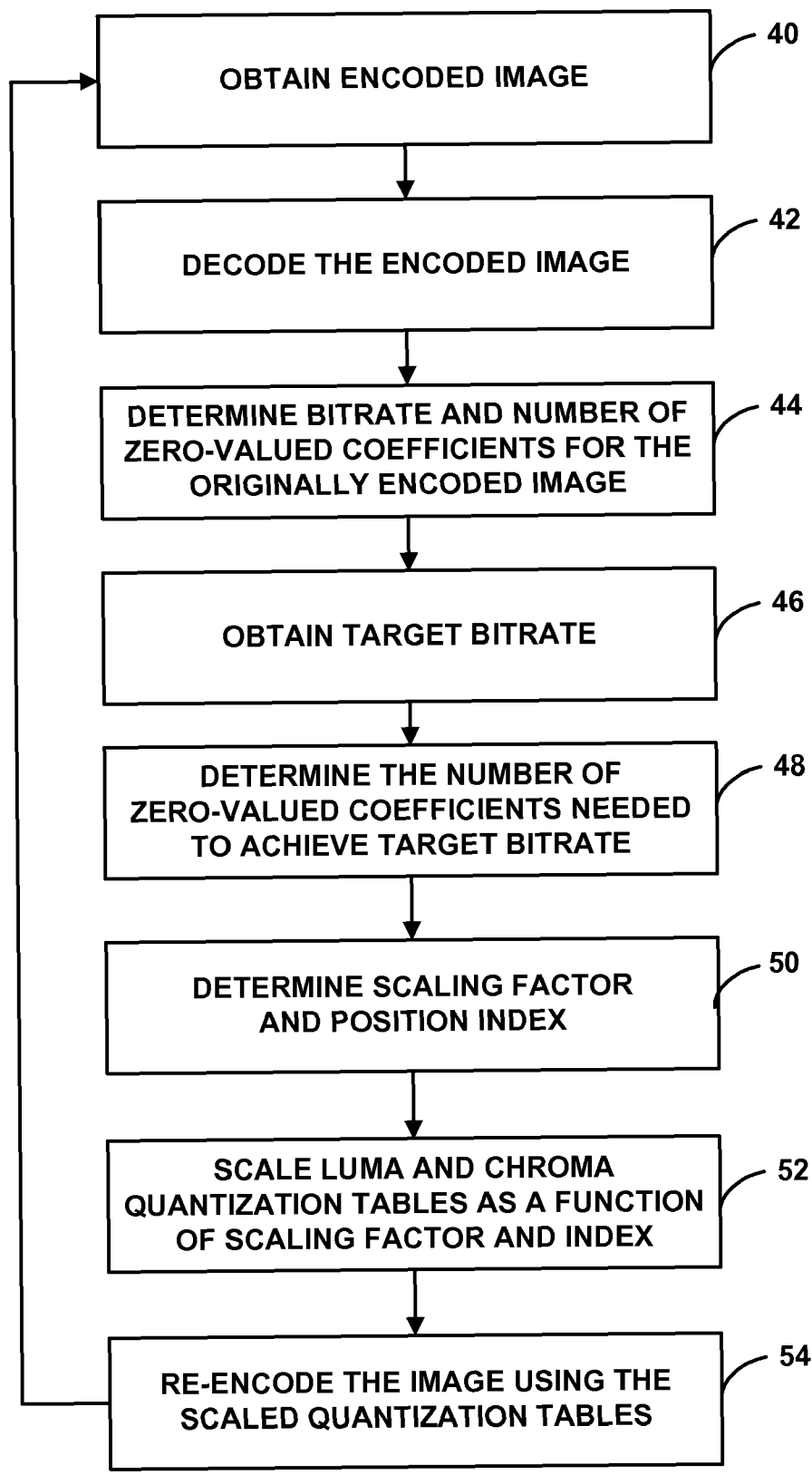
FIG. 3 is a flow diagram illustrating exemplary operation of an encoding module transcoding an image in accordance with the macroscale bitrate reduction techniques described herein.

FIG. 3 is a flow diagram illustrating exemplary operation of an encoding module, such as encoding module 12 of FIG. 2, transcoding an image in accordance with the macroscale bitrate reduction techniques described herein. Initially, encoding module 12 obtains an encoded image (40). In some aspects, encoding module 12 may obtain the encoded image from a media source 18. Alternatively, encoding module 12 may obtain raw image data and perform an initial encoding of the image data to obtain the encoded image.

Encoding module 12 decodes the encoded image (42). Entropy decoding module 32 may decode the encoded image using a code table associated with the image to obtain quantized transform coefficients and inverse quantization module 34 performs inverse quantization to generate transform coefficients for the image.

Encoding module 12 determines a bitrate and a number of zero-valued quantized transform coefficients for the originally encoded image, i.e., $R_o$ and $z_o$ (44). The bitrate may be computed based on the file size of the encoded image. The number of zero-valued quantized transform coefficients may be determined by analyzing the matrix of quantization coefficients obtained during the decoding. In one aspect, the transcoding process may operate in accordance with an observer design pattern. In that case, the number of zero-valued coefficients as well as other statistics may be computed during a first pass decoding and the transcoding described below may occur during a second pass.

Encoding module 12 obtains a target bitrate (46). Encoding module 12 may, for example, obtain the target bitrate from a user of the device or a network service provider. Alternatively, encoding module 12 may compute the target bitrate $R_T$ based on a target file size ($F_T$) specified by a user or obtained from a network service provider. The target file size $F_T$ may, for example, be specified in bytes, and include header information and DC bits as well as the AC bits. In one aspect, encoding module 12 may compute the target bitrate $R_T$ in accordance with the equation $R_T = 8*F_T - H - DC$, where H is the number of header bits and DC is the number of bits to represent the DC component of the image.

Encoding module 12 determines the number of zero-valued quantized transform coefficients necessary to achieve the target bitrate ($z_T$) (48). For example, transcoding module 36 may calculate the target number of zero-valued quantized transform coefficients $z_T$ using the target bitrate $R_T$, the bitrate of the originally encoded image $R_o$ and the number of zero-valued quantized transform coefficients of the originally encoded image $z_o$. In one aspect, transcoding module 36 calculates $z_T$ as shown in equations (3)-(5) above.

Encoding module 12 determines a scaling factor s and position index k based on the target number of zero-valued quantized transform coefficients (50). Transcoding module 36 may use a histogram of coefficient values to select a scaling factor s such that the number of zero-valued coefficient that result from the scaling of luma quantization table 38 and chroma quantization table 39 does not exceed $z_T$. As an example, suppose that a histogram of an image indicates that there are 1000 coefficients with a value of 1 and 2000 coefficients with a value of 2. Moreover, suppose that the number of target zero-valued coefficients ($z_T$) is 1500. Transcoding module 36 selects a scaling factor of 2, which is the largest scaling factor that does not result in z exceeding $z_T$. Transcoding module 36 may further determine a position index k at which application of a second, larger scaling factor to the coefficients after the position index results in the desired number of zero-valued coefficients.

Encoding module 12 scales luma quantization table 38 and chroma quantization table 39 as a function of the scaling factor s and position index k (52). Transcoding module 36 may order quantization entries of luma quantization table 38 and chroma quantization table 39 into a single sequence of entries and scale the first k entries of the sequence by scaling factor s and the remainder of the entries of the sequence by a larger scaling factor, e.g., s+1. In this manner, chroma quantization table 39 is scaled more than luma quantization table 38 to better preserve the brightness of the image. Moreover, scaling portions of the entries of the quantization tables by different scaling factors reduces the likelihood of overshooting our target bitrate or undershooting the target bitrate.

Encoding module 12 re-encodes the image using the scaled quantization tables (54). For example, quantization module 28 quantizes the transform coefficients using the scaled quantization tables and entropy encoding module 30 encodes the quantization coefficients to generate an encoded bitstream. In the example described in the flow diagram of FIG. 3, encoding module 12 transcodes the image in the frequency domain, i.e., using the transform coefficients. Transcoding the image data in the frequency domain may reduce the processing time by eliminating the need to apply an inverse transform function to the transform coefficients. In other aspects, however, encoding module 12 may include an inverse transform module that obtains the raw image data and transcode the image using the raw image data.

Figure 4:
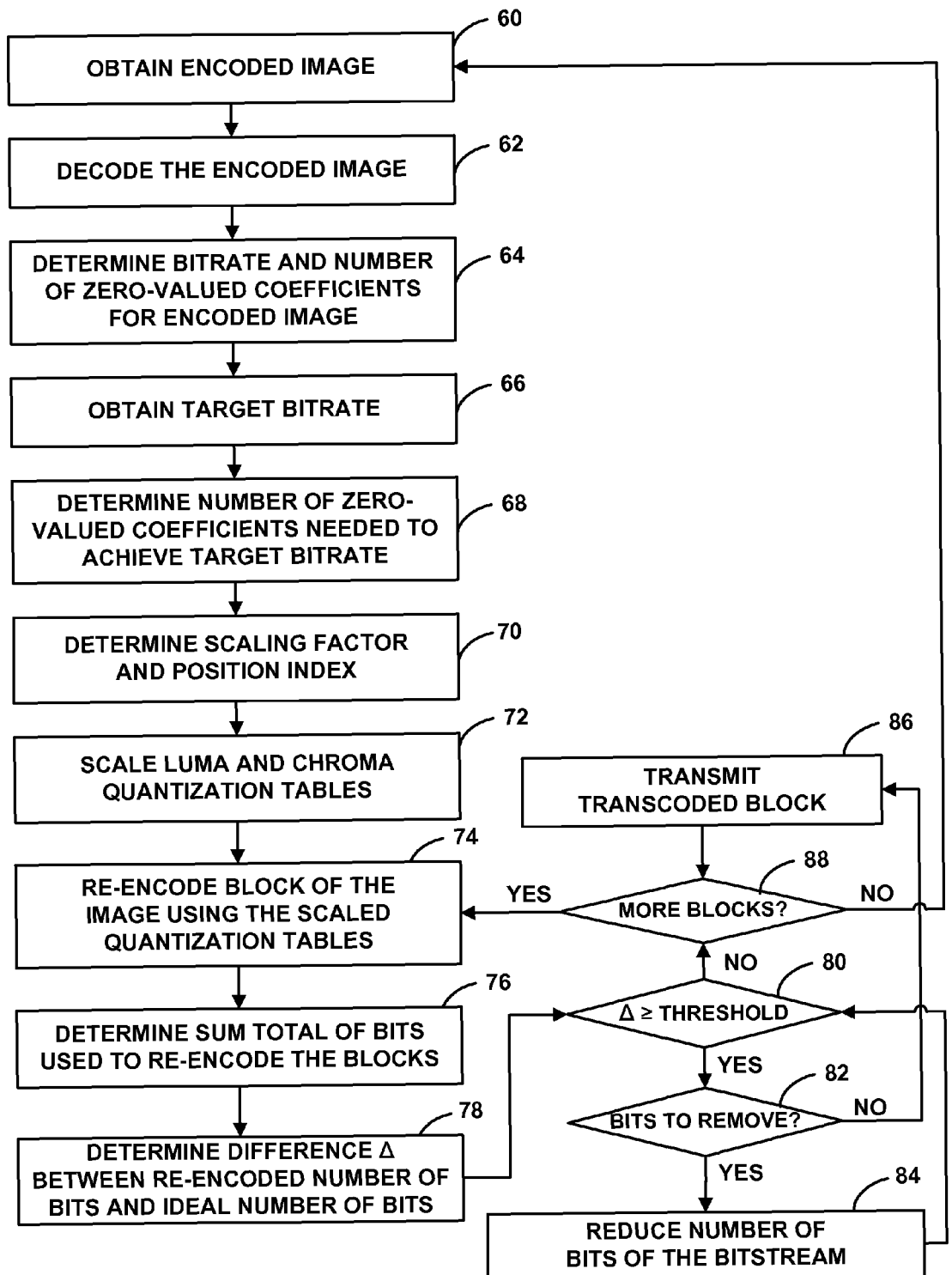
FIG. 4 is a flow diagram illustrating exemplary operation of an encoding module transcoding an image using a combination of the macroscale bitrate reduction techniques and microscale bitrate reduction techniques.

FIG. 4 is a flow diagram illustrating exemplary operation of an encoding module, such as encoding module 12 of FIG. 2, transcoding an image using a combination of the macroscale bitrate reduction techniques and microscale bitrate reduction techniques. Initially, encoding module 12 obtains an encoded image (60). Encoding module 12 may obtain a previously encoded image from media source 18 or obtain raw image data from media source 18 and perform an initial encoding of the image data to obtain the encoded image.

Encoding module 12 decodes the encoded image (62). Encoding module 12 determines a bitrate and a number of zero-valued quantized transform coefficients for the originally encoded image, i.e., $R_o$ and $z_o$, respectively (64). The bitrate may be computed based on a file size of the encoded image. The number of zero-valued quantized transform coefficients may be determined during the decoding. Encoding module 12 obtains a target bitrate (66). Encoding module 12 may, for example, obtain the target bitrate from a user of the device or network service provider. Alternatively, encoding module 12 may compute the target bitrate $R_T$ based on a target file size ($F_T$) specified by a user or obtained from a network service provider.

Encoding module 12 determines the target number of zero-valued quantized transform coefficients $z_T$ necessary to achieve the target bitrate (68). For example, transcoding module 36 may calculate the target number of zero-valued quantized transform coefficients ($z_T$) using the target bitrate $R_T$, the bitrate of the originally encoded image $R_o$ and the number of zero-valued quantized transform coefficients of the originally encoded image $z_o$. In one aspect, transcoding module 36 calculates $z_T$ as shown in equations (3)-(5) above.

Encoding module 12 determines a scaling factor s and position index k based on the target number of zero-valued quantized transform coefficients (70). Transcoding module 36 may compute the scaling factor s and position index k such that it satisfies the equation:

$$z_T \geq z_o + \sum_{q=0}^{1} \sum_{i=1}^{63} \sum_{v=1}^{s-1} H(q, i, v) + \sum_{n=k(n \neq 64)}^{127} H\left(q = \left\lfloor \frac{n}{64} \right\rfloor, i = n\bmod 64, v = s\right).$$

Encoding module 12 scales luma quantization table 38 and chroma quantization table 39 as a function of the scaling factor s and position index k (72). Transcoding module 36 may, for example, order quantization entries of luma quantization table 38 and chroma quantization table 39 into a single sequence of entries and scale the first k entries by scaling factor s and the remainder of the entries by a larger scaling factor, e.g., s+1. The larger scaling factor results in more transform coefficients being quantized to zero. In this manner, chroma quantization table 39 is scaled more than luma quantization table 38 to better preserve the brightness of the image. Moreover, scaling portions of the entries of the quantization tables by different scaling factors reduces the likelihood of overshooting our target bitrate or undershooting the target bitrate.

Encoding module 12 re-encodes a block of the image using the scaled quantization tables (74). For example, quantization module 28 quantizes the transform coefficients of the block using the scaled quantization tables and entropy encoding module 30 encodes the quantization coefficients of the block to generate an encoded bitstream for the block. Encoding module 12 determines the sum total of the number of bits used to re-encode the n blocks $R_e(n)$ of the image (76). In other words, encoding module 12 keeps a running total of the number of bits used to re-encode the blocks of the image. For example, transcoding module 36 may track the number of bits that have been transcoded for the particular block and adds it to the totals for other blocks. Transcoding module 36 computes a difference ($\Delta$) between the sum total of the number of bits used to re-encode the blocks $R_e(n)$ and an ideal number of bits that should be encoded at the $n^{th}$ block $R_t(n)$ (78).

Transcoding module 36 determines whether $\Delta$ is greater than or equal to a threshold (80). The threshold may, for example, be a function of the target bitrate, e.g., 5% of the target bitrate. When transcoding module 36 determines $\Delta$ is greater than or equal to the threshold, transcoding module 36 determines whether there are bits that may be removed from the current block using one or more microscale bitrate control techniques (82). As described in detail above, transcoding module 36 may determine whether the current block has any quantized transform coefficients that are a power of two or whether the bit sequence of the block has a bit sequence that represents a market.

When transcoding module 36 determines that there are bits that can be removed from the bitstream of the current block, transcoding module 36 further reduces the number of bits of the bitstream (84). If the bits identified as removable are quantized transform coefficients that are a power of two, or close to a power of two, transcoding module 36 may decrement one or more of the coefficients by a value such that the coefficient value falls below the corresponding power of two and re-encodes the reduced coefficient. As described above, reducing the coefficient that is a power of two by a value of one reduces the number of bits needed to represent the coefficient. In particular, there is a one bit savings. If the bits identified as removable are part of the bit sequence of the block that represents a marker, transcoding module 36 may reduce the number of bits of the bitstream by reducing the number of padding bytes. As described above, transcoding module 36 may insert padding bytes following a bit sequence that corresponds to a marker for metadata. In the case of the JPEG standard, for example, a zero byte 0x00 may be inserted after the occurrence of 0xFF in the entropy coding bitstream to differentiate the actual coefficient bitstream from a marker. Transcoding module 36 may change at least one bit of the sequence that represents a marker when the bit corresponds to the residue. For example, transcoding module 36 may change the least significant bit of the residue that prevents the writing of sequence that corresponds to a marker to the coefficient bitstream. Upon changing this bit, the bit sequence no longer represents a marker and no padding bytes are necessary.

After reducing the number of bits of the bitstream, transcoding module 36 compares an adjusted Δ, i.e., one that is reduced by the number of bits removed, to the threshold (80). If Δ still exceeds the threshold, transcoding module 36 determines whether there are any more bits that can be removed from the current block (82). If there are additional bits of the current block that can be removed while maintaining adequate quality, transcoding module 36 further reduces the number of bits of the block. If there are no bits to remove from the current block while maintaining adequate quality or Δ no longer exceeds the threshold, transcoding module 36 transmits the transcoded block (86). In some cases, however, transcoding module 36 may not transmit the transcoded blocks, but wait for all blocks of the image to be encoded and then transmit the entire image.

Transcoding module 36 determines whether there are additional blocks to be encoded (88). When there are additional blocks to be encoded, transcoding module 36 continues to re-encode the blocks using the adjusted quantization tables and, if needed, the microscale bitrate control techniques. In this manner, transcoding module 36 may implement two tiers of bitrate control to transcode the image: a first tier of bitrate control on a macroscale, where global transcoding techniques affect the entire image equally and uniformly, and a second tier of bitrate control on a microscale, where the effect of the transcoding operation is localized to specific regions of the image. This two-tiered strategy allows the transcoding module 36 to first coarsely approach the target bitrate and then make fine adjustments as necessary.

Figure 5:
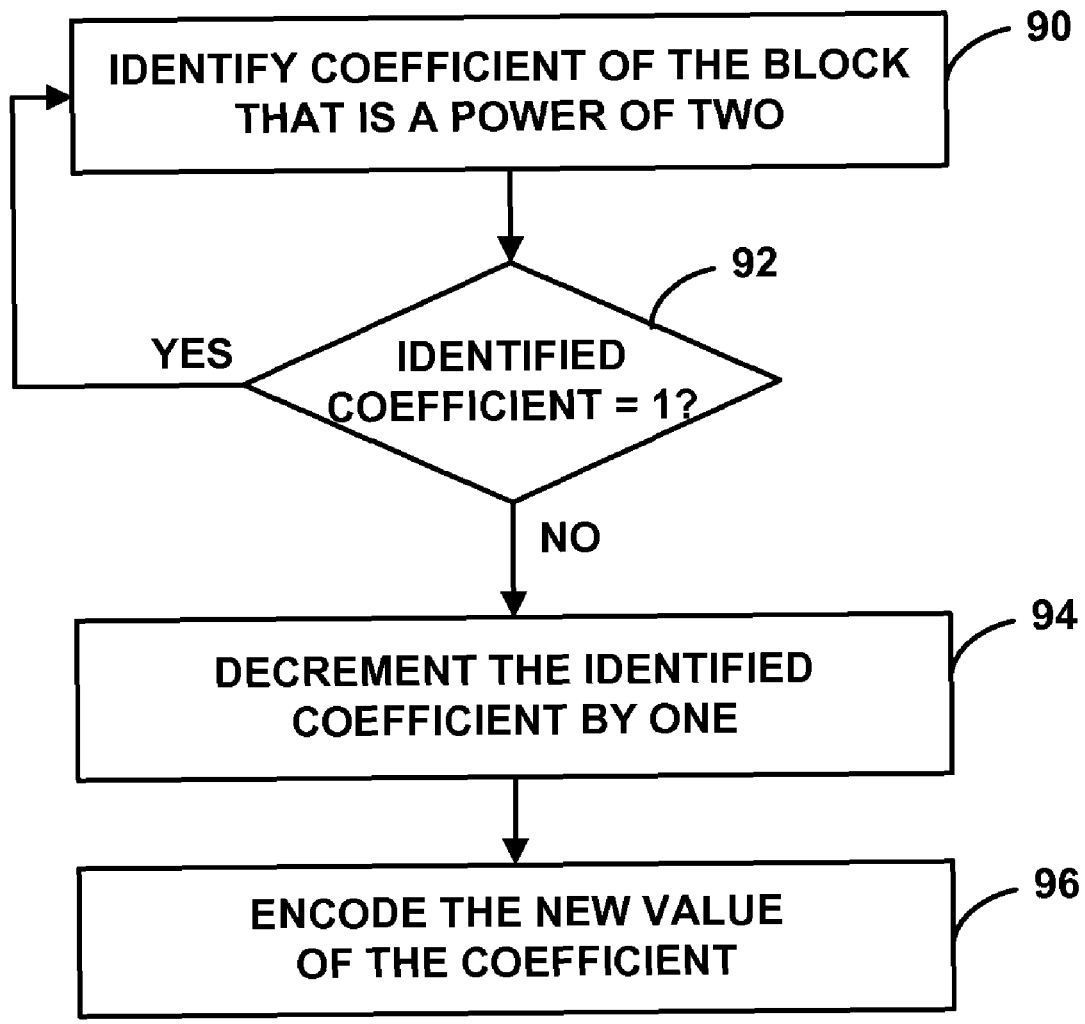
FIG. 5 is a flow diagram illustrating exemplary operation of an encoding module implementing microscale bitrate control to further reduce the bitrate of an image.

FIG. 5 is a flow diagram illustrating exemplary operation of an encoding module, such as encoding module 12 of FIG. 2, implementing microscale bitrate control to further reduce the bitrate of an image. As described above, entropy encoding module 30 assigns codes for AC coefficients based on the run-length of zeroes and the binary size of the coefficient. Transcoding module 36 cannot change the run-length of zeroes without radically altering the block, but it can subtly change the binary size of a coefficient. In particular, transcoding module may identify a coefficient of a block that is a power of two (90).

Transcoding module 36 determines whether the identified coefficient is equal to one (92). If the identified coefficient is not equal to one, transcoding module 36 decrements the identified coefficient by one (94). Transcoding module 36 encodes the new value of the coefficient (96). For a coefficient value of eight, for example, transcoding module 36 codes the length of the residue with four bits. Transcoding module 36 may code the length of the residue of the reduced coefficient value of seven with only three bits, thereby reducing the bitstream by one bit. Moreover, the Huffman code to represent the run-size is likely also shorter resulting in additional bit savings.

If the identified coefficient is equal to one, however, transcoding module 36 selects a different one of the coefficients of the block that is a power of two. Decrementing a coefficient with a value of one would result in a new coefficient value of zero. In other words, that particular component of the transform is eliminated entirely, which introduces greater distortion and/or artifacts than desired. Therefore transcoding module 36 may not reduce coefficients with a value of one.

In this manner, transcoding module 36 may further reduce the number of bits in the bitstream by selectively reducing the values of one or more coefficients. As described above, the encoded bitstream of the image is comprised mostly of Huffman codes and residue strings for the AC coefficients. By selectively reducing the values of one or more coefficients, transcoding module 36 may reduce the length of the Huffman code for the reduced coefficients. This is because smaller coefficient values are usually more frequent than larger coefficient values and thus are usually assigned shorter Huffman codes. Moreover, transcoding module 30 may save bits in the residue by selectively reducing one or more of the coefficient values. Although FIG. 5 is described in terms of reducing coefficients that are equal to a power of two, the techniques may be extended to apply to coefficients that have values that are close to a power of two. For example, a coefficient value of nine may be reduced by two resulting in a new coefficient value of seven, which may be represented by a reduced number of bits and a shorter Huffman code. How close the coefficient value should be to a power of two depends on the amount of distortion that is considered acceptable.

The microscale bitrate control technique described in FIG. 5 may be used in conjunction with the macroscale bitrate control techniques to further reduce the size of image, when necessary. Alternatively, the microscale rate control technique may be utilized independently of the macroscale rate control techniques, either to transcode an already encoded image or to perform initial encoding of the image.

Figure 6:
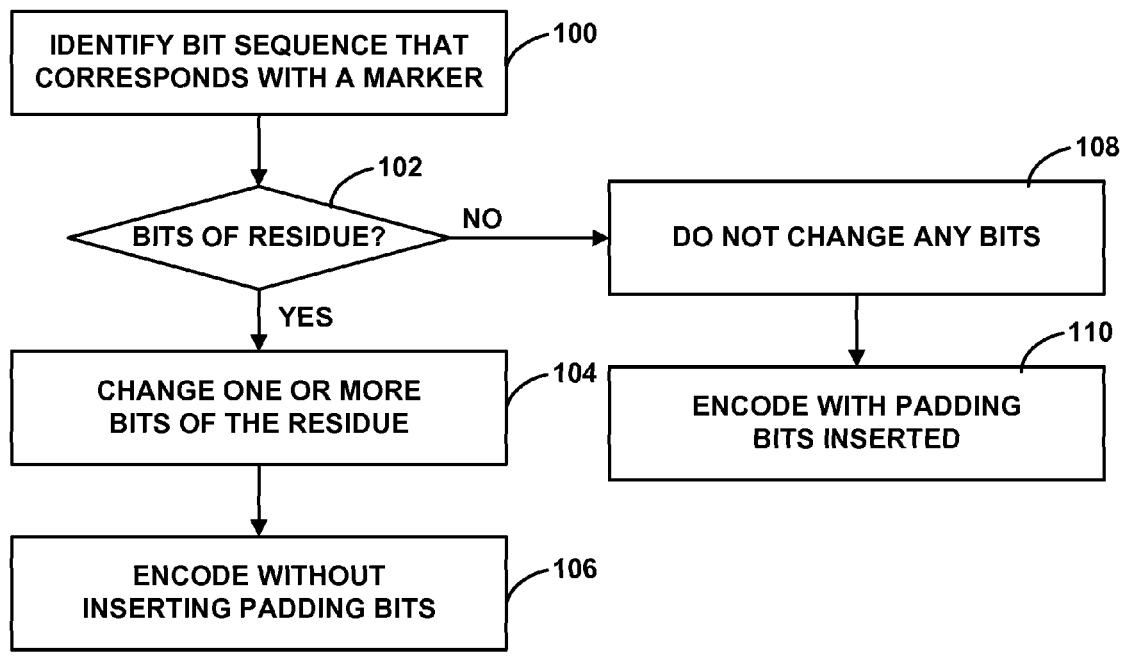
FIG. 6 is a flow diagram illustrating exemplary operation of an encoding module implementing another type of microscale bitrate control to further reduce the bitrate of an image.

FIG. 6 is a flow diagram illustrating exemplary operation of an encoding module, such as encoding module 12 of FIG. 2, implementing microscale bitrate control to further reduce the bitrate of an image. Transcoding module 36 identifies locations in the bitstream where there is a bit sequence that corresponds with a marker (100). As described above, an image compression technique may use a particular bit sequence as a marker to identify regions of metadata. In the JPEG standard, a two-byte marker that begin with the byte 0xFF is used to identify regions of metadata followed by a byte indicating the type of metadata that follows. When encoding of coefficients introduces a bit sequence the corresponds with the marker 0xFF, entropy coding module 30 stuffs a zero byte 0x00 into the bitstream to disambiguate the coefficient bitstream from a marker. Thus, transcoding module 36 may include a bit buffer that stores the leftmost bits that comprise the next byte written to the bitstream and monitor the buffer for bit sequence that corresponds with the marker, e.g., 0xFF in the case of the JPEG standard.

Transcoding module 36 determines whether the bit sequence includes at least one bit that represents a residue (102). When the bit sequence includes at least one bit that represents a residue, transcoding module 36 may change one or more bits of the eight bits that represent the residue (104). For example, transcoding module 36 may change the least significant bit of the bits the represent the residue. This in turn, prevents the occurrence of the bit sequence that represents a marker and only minimally changes the value of the residue. Transcoding module 36 then encodes the bit sequence without inserting padding bits (106). In some cases, transcoding module 36 may typically insert a padding byte. In that case, eight bits are conserved.

When the bit sequence does not include at least one bit that represents the residue, transcoding module 36 does not change any bits (108) and encodes the sequence with padding bits inserted (110). Changing a bit of the Huffman code would result in a change in the Huffman code which would then result in an error at the decoding device.

The microscale bitrate control technique described in FIG. 6 may be used in conjunction with the macroscale bitrate control techniques to further reduce the size of image, when necessary. Alternatively, the microscale rate control technique may be utilized independently of the macroscale rate control techniques, either to transcode an already encoded image or to perform initial encoding of the image.

The techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more DSPs, general purpose microprocessors, ASICs, field programmable logic arrays FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Hence, the disclosure also contemplates any of a variety of integrated circuit devices that include circuitry to implement one or more of the techniques described in this disclosure. Such circuitry may be provided in a single integrated circuit chip or in multiple, interoperable integrated circuit chips.

Various examples have been described. These and other examples are within the scope of the following claims.

The invention claimed is:

1. A method of processing blocks of digital image data comprising:
    scaling one or more quantization tables as a function of a computed scaling factor to create a first quantization table set;
    encoding a first portion of a plurality of blocks of pixels of the digital image data using the first quantization table set;
    encoding a second portion of a remaining unencoded portion of the plurality of blocks of image data using the first quantization table set;
    tracking a difference between a total number of encoded bits of the encoded second portion and a number of bits that ideally should be encoded at the second encoded portion to achieve a target bitrate; and
    removing one or more bits of the encoded second portion when the difference is greater than or equal to a threshold, wherein scaling the one or more quantization tables comprises scaling a luma quantization table and a chroma quantization table, wherein the chroma quantization table is scaled more than the luma quantization table, and
    wherein scaling the luma quantization table and the chroma quantization table comprises
    scaling a first portion of the luma quantization table by the computed scaling factor, and
    scaling a second portion of the luma quantization table and the chroma quantization table by a second scaling factor, wherein the second scaling factor is determined as a function of the computed scaling factor, and
    wherein the computed scaling factor and second scaling factor are greater than or equal to one, and further wherein the computed scaling factor is smaller than the second scaling factor.

2. The method of claim 1, further comprising:
    identifying a desired number of zero-valued quantized transform coefficients to achieve the target bitrate based on a bitrate of the image data as initially encoded, a number of zero-valued quantized transform coefficients of the image data as initially encoded, and the target bitrate; and
    computing the scaling factor for use in scaling the one or more quantization tables based on the desired number of zero-valued quantized transform coefficients.

3. The method of claim 1, further comprising:
    ordering quantization entries of the luma quantization table and the chroma quantization table into a single sequence beginning with low frequency quantization entries of the luma quantization table followed by high frequency quantization entries of the luma quantization table then low frequency quantization entries of the chroma quantization table and then high frequency quantization entries of the chroma quantization table;
    scaling the first k quantization entries of the sequence by the computed scaling factor; and
    scaling the remaining N-k quantization entries of the sequence by the second scaling factor, wherein N is the total number of quantization entries of the sequence.

4. The method of claim 1, wherein removing the one or more bits comprises: selecting one or more quantized transform coefficients that will not equal zero when decremented to a value below a respective power of two; and
    decrementing the one or more selected quantized transform coefficients until the selected quantized transform coefficients are less than the respective power of two.

5. The method of claim 1, wherein removing the one or more bits comprises:
    identifying at least one bit sequence that includes a plurality of bits arranged in a manner to act as a marker that requires stuffing of one or more bits; and
    changing at least one of the plurality of bits of the bit sequence that corresponds to a residue such that the bit sequence no longer acts as the marker.

6. A computer-program product for processing digital image data comprising a non-transitory computer readable medium having instructions thereon, the instructions comprising:
    code for scaling one or more quantization tables as a function of a computed scaling factor to create a first quantization table set;
    code for encoding a plurality of blocks of pixels of the digital image data using the first quantization table set;
    code for encoding a second portion of a remaining unencoded portion of the plurality of blocks of image data using the first quantization table set;
    code for tracking a difference between a total number of encoded bits at the second encoded portion and a number of bits that ideally should be encoded at the second encoded portion to achieve a target bitrate; and
    code for removing one or more bits of the second encoded portion when the difference is greater than or equal to a threshold, wherein code for scaling the one or more quantization tables comprises code for scaling a luma quantization table and a chroma quantization table, wherein the chroma quantization table is scaled more than the luma quantization table, wherein code for scaling the luma quantization table and the chroma quantization table comprises:

code for scaling a first portion of the luma quantization table by the computed scaling factor, code for scaling a second portion of the luma quantization table and the chroma quantization table by a second scaling factor, wherein the second scaling factor is determined as a function of the computed scaling factor, and wherein the computed scaling factor and second scaling factor are greater than or equal to one, and further wherein the computed scaling factor is smaller than the second scaling factor.

7. The computer-program product of claim 6, wherein the instructions further comprise:

code for identifying a desired number of zero-valued quantized transform coefficients to achieve the target bitrate based on a bitrate of the image data as initially encoded, a number of zero-valued quantized transform coefficients of the image data as initially encoded, and the target bitrate; and code for computing the scaling factor for use in scaling the one or more quantization tables based on the desired number of zero-valued quantized transform coefficients.

8. The computer-program product of claim 6, wherein code for scaling the luma quantization table and the chroma quantization table comprises:

code for ordering quantization entries of the luma quantization table and the chroma quantization table into a single sequence beginning with low frequency quantization entries of the luma quantization table followed by high frequency quantization entries of the luma quantization table then low frequency quantization entries of the chroma quantization table and then high frequency quantization entries of the chroma quantization table;

code for scaling the first k quantization entries of the sequence by the computed scaling factor; and code for scaling the remaining N-k quantization entries of the sequence by the second scaling factor, wherein N is the total number of quantization entries of the sequence.

9. The computer-program product of claim 6, wherein code for removing the one or more bits comprises:

code for selecting one or more quantized transform coefficients that will not equal zero when decremented to a value below a respective power of two; and code for decrementing the one or more selected quantized transform coefficients until the selected quantized transform coefficients are less than the respective power of two.

10. The computer-program product of claim 6, wherein code for removing the one or more bits comprises:

code for identifying at least one bit sequence that includes a plurality of bits arranged in a manner to act as a marker that requires stuffing of one or more bits; and code for changing at least one of the plurality of bits of the bit sequence such that the bit sequence no longer acts as the marker.

11. The computer-program product of claim 6, further comprising code for resuming the encoding of the blocks of the image data using the one or more scaled quantization tables without removing the one or more additional bits when the difference falls below the threshold.

12. The method of claim 1, further comprising transmitting the first encoded portion.

13. The computer program product of claim 6, further including instructions comprising code for transmitting the first encoded portion.

* * * * *